United States Patent [19]
DeLano

[11] 4,155,167
[45] May 22, 1979

[54] DIPSTICK GUIDE

[76] Inventor: Arthur DeLano, #2 Fire Station, 145 N. Washington, Battle Creek, Mich. 49017

[21] Appl. No.: 917,914

[22] Filed: Jun. 22, 1978

[51] Int. Cl.² .......................................... G01F 23/04
[52] U.S. Cl. ............................................. 33/126.7 R
[58] Field of Search ................... 33/126.7 R, 126.7 A

[56] References Cited
U.S. PATENT DOCUMENTS

| | | | |
|---|---|---|---|
| 1,926,945 | 9/1933 | Hipp | 33/126.7 R X |
| 1,981,270 | 11/1934 | Hollingsworth | 33/126.7 R |
| 2,314,430 | 3/1943 | Smith | 33/126.7 R |
| 3,316,647 | 5/1967 | Swallert | 33/126.7 R |

FOREIGN PATENT DOCUMENTS 587944  1/1959  Italy .................................. 33/126.7 R Primary Examiner—Charles E. Phillips
Attorney, Agent, or Firm—Fisher, Gerhardt & Groh

[57] ABSTRACT

A dipstick guide for a dipstick measuring the level of oil in the crankcase of an engine wherein a housing has an enlarged funnel like opening and is attached to the dipstick supporting tube. The arrangement includes a guide element which is positioned to assist guiding the end of the dipstick into the opening in the dipstick tube but which is moved out of that position by the dipstick to insure that the dipstick reaches its normal position for measuring the level of oil. The arrangement includes illuminating means helping to locate the opening to the dipstick supporting tube and also serving as a signal that the disptick is not properly seated for its measuring function.

11 Claims, 3 Drawing Figures

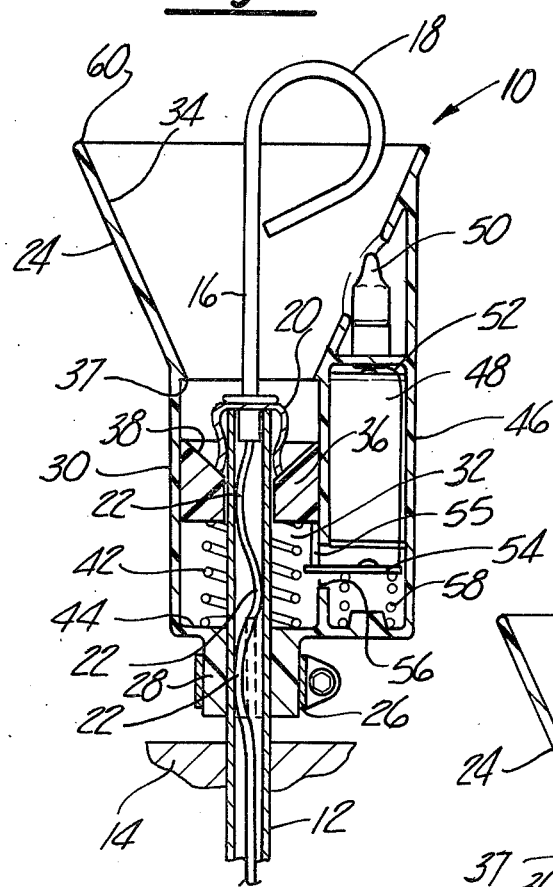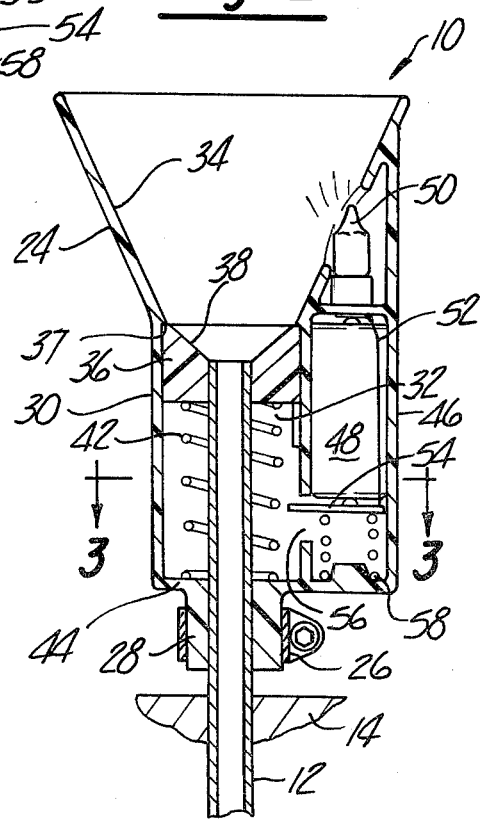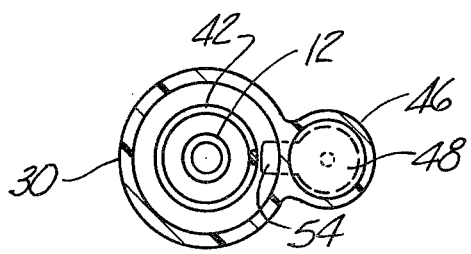

DIPSTICK GUIDE

This invention relates to dipstick arrangements used to measure the level of lubrication oil in the crankcase of internal combustion engines and more particularly to a guide and illumination arrangement facilitating return of the dipstick to its normal position.

The replacing of a dipstick from its supporting tube after it has been removed for measuring the level of oil in the crankcase of an internal combustion engine is difficult in almost all models of automotive engines. Moreover, even in daylight hours or with good illumination it is difficult to locate the dipstick tube after the dipstick has been removed.

It is an object of the invention to provide a guide for facilitating return of the dipstick to its supporting tube after it has been removed to measure the oil level.

Another object of the invention is to provide an illuminated dipstick guide making it possible to visually locate the dipstick tube after the dipstick has been removed.

Another object of the invention is to provide a guide attachment for a dipstick tube which may be attached in position to afford the guiding and illuminating features and which uses the original dipstick without in any way detracting from the accuracy of the reading obtained when measuring the level of oil.

The objects of the invention are accomplished by a dipstick guide which is attachable to a supporting dipstick tube communicating with the crankcase of an internal combustion engine which includes a housing mounted on the dipstick tube and forming an annular chamber receiving an annular guide element. The annular guide element is held in alignment with walls of the housing to form a relatively continuous guide surface for guiding the end of the dipstick into the opening in the dipstick tube and when the dipstick is in its normal position closing the dipstick tube the guide element is moved to a location in which it does not obstruct the seating of the dipstick to obtain an accurate reading of the oil level. The arrangement also includes an illuminating means which is energized when the dipstick is removed to assist in locating the dipstick opening for return of the dipstick and also serves as a signal device in that it remains energized until the dipstick is in its fully seated oil measuring position.

These and other objects of the invention will be apparent from the following description of the drawings in which:

FIG. 1 is a sectional view of the dipstick guide embodying the invention with the dipstick in closed position in the dipstick tube;

FIG. 2 is a view similar to FIG. 1 showing another operating condition with the dipstick removed; and FIG. 3 is a cross sectional view taken on line 3—3 in FIG. 2.

A dipstick guide assembly embodying the invention is designated generally at 10 and is shown in association with a dipstick tube 12 projecting from the wall 14 of a crankcase of an internal combustion engine. The dipstick tube 12 supports a dipstick 16 of conventional form having a loop 18 at its upper end forming a finger hold by which the dipstick 16 is removed from and replaced in the tube 12. The dipstick 16 is provided with a cover 20 which engages the upper end of the tube to maintain it in a closed position when the dipstick is in its normal position. The dipstick 16 also is provided with wave forms 22 which serve to engage diametrically opposed interior walls of the tube 12 to frictionally maintain the dipstick 16 in its normal, closed position. The cover 20 in engagement with the end of the tube 12 determines the proper location of the dipstick 16 for accurately measuring the level of lubricating oil in the crankcase.

The dipstick guide assembly 10 includes a housing 24 attached to the exterior of the tube 12 by means of a strap clamp 26 forcing a flange 28 of the housing to engagement with the exterior of the tube. The housing 24 has a cylindrical wall portion 30 disposed coaxially of the tube 12 forming an annular chamber 32. The upper end of the cylindrical wall 30 merges with a conical wall 34.

An annular guide element 36 is disposed in the annular chamber 32 and is retained therein by a shoulder 37 at the lower end of wall 34. An upper surface 38 of the guide element 36 is generally conical with its larger circumference adjacent the wall 30 and its smaller circumference adjacent to the exterior wall of the dipstick tube 12. In the position seen in FIG. 2, the guide element 36 has its upper surface 38 in alignment with the conical wall 34 of the housing 24 to form a continuous guide surface which upon downward movement of the dipstick 16 and insures its passage into open end of the tube 12. The guide element 36 is movable from the first position shown in FIG. 2 to the position shown in FIG. 1 upon engagement of the cover 20 of the dipstick 16 with the upper surface 38. As the dipstick 16 is moved to its normal position the guide element 36 is moved to the lower end of the annular chamber 32 against the action of a spring 42 acting between the guide element 36 and the bottom well 44 of the housing 24. The spring 42 serves to bias the guide element 36 to the position seen in FIG. 2 upon removal of the dipstick 16.

The housing 24 has a battery case 46 disposed to one side of the cylindrical wall 30 which serves to support a small battery 48. The upper end of the battery 48 is in electrical contact with a small lamp 50. The circuit to energize the lamp is completed by a conductor 52 in continuous contact with a switch element 54. Switch element 54 is engaged by a contact element 55 depending from guide element 36 upon movement between the positions illustrated in FIGS. 1 and 2.

In the position seen in FIG. 1 the switch element 54 is held out of engagement with the end of the battery 48 by contact element 55 and when the dipstick 16 is removed as seen in FIG. 2, the switch element 54 is biased upwardly by a spring 58 into engagement with the lower end of the battery 48 to complete the circuit energizing the lamp 50. Upon replacement of the dipstick 16 the switch 54 is moved out of engagement with the battery 48 to break the circuit.

It will be noted that the dipstick guide assembly 10 is attached to the tube 12 in a manner making it possible for the original dipstick to be used since the dipstick is brought to the same position for the measuring function whether or not a guide assembly 10 is provided.

The guide assembly 10 of the present invention permits easy insertion of the dipstick 16 by providing a continuous guide surface from the outer lip 60 of the conical wall 34 and the surface 38 of the guide element 36 to the open end of the dipstick tube 12. At the same time that the dipstick is removed for wiping or observing the oil level, the lamp 50 is energized. The lamp 50 remains illuminated so long as the dipstick is not in its normal position as seen in FIG. 1. The illumination helps to locate the dipstick tube 12 and at the same time serves as a signal indicating that the dipstick 16 has not yet reached its correct oil level indicating position.

A dipstick guide assembly has been provided in the form of an attachment for mounting on the dipstick support tube in such a manner that the original dipstick can be used. This is made possible by annular guide element 36 which is biased to a guiding position to facilitate return of the dipstick to its original position and which moves out of position when it is no longer needed as a guide surface to permit return of the dipstick to its proper oil measuring position. the dipstick includes illumination means which not only serve to help to locate the dipstick tube but also acts as a signal warning the observer that the dipstick is not in the proper position measuring the oil level until the lamp is no longer illuminated.

The embodiments of the invention in which an exclusive property or privilege is claimed are defined as follows:

1. A dipstick guide for guiding a dipstick into a supporting dipstick tube comprising; a housing adapted to be detachably mounted in spaced relationship to the open end of said dipstick tube and having an enlarged opening, a guide element having an annular guide surface surrounding said tube, said guide element being movable from a first position in which said guide surface is above the open end of said dipstick tube to form a guide path for the end of the dipstick to a second position displaced below the end of said tube to receive said dipstick in its original position closing said tube, and means biasing said guide element to said first position upon removal of said dipstick from said tube.

2. The combination of claim 1 wherein said guide element has a conical guide surface with its smaller circumference adjacent an outer wall of said dipstick tube and its larger circumference adjacent the side of said housing.

3. The combination of claim 2 wherein said housing forms an additional conical guide surface in alignment with the guide surface of said guide element when the latter is in its first position to form a continuous guide surface.

4. The combination of claim 3 wherein said housing has a generally cylindrical wall portion disposed coaxially with said support tube and merging with said conical guide surface.

5. The combination of claim 4 wherein said guide element is slidable in said housing between said cylindrical wall and said support tube between said first and second positions.

6. The combination of claim 1 and further comprising means supported by said housing to illuminate said housing.

7. The combination of claim 6 wherein the means to illuminate said housing is actuated in response to movement of said guide element from said second to said first position.

8. The combination of claim 6 wherein said means supported by said housing includes a source of power to energize a lamp for illuminating said housing.

9. The combination of claim 1 and further comprising clamp means associated with said housing for clamping said housing to the exterior of said supporting tube.

10. A dipstick guide for use with a dipstick supported in and closing a dipstick tube, the combination comprising; a housing adapted to be detachably mounted a predetermined distance from the end of said dipstick tube, a guide element having an annular guide surface surrounding said tube, said guide element being movable from a first position in which said guide element is in alignment with the open end of said dipstick tube to form a guide path for the end of the dipstick to a second position displaced from the end of said tube to receive said dipstick in its original position closing said tube, means biasing said guide element to said first position upon removal of said dipstick from said tube and permitting movement to said second position upon engagement by said dipstick during replacement in said tube, and means illuminating the interior of said housing upon removal of said dipstick from its supporting tube.

11. The combination of claim 10 wherein said means illuminting said housing includes a source of power, a lamp disposed in said housing and circuit means including a switch between said source of power and lamp means for energizing the latter upon movement of said guide element from said first to said second positions.

* * * * *